(12) United States Patent
Wong et al.

(10) Patent No.: US 11,077,707 B2
(45) Date of Patent: Aug. 3, 2021

(54) ACTIVE AERODYNAMIC WHEEL CAP DEVICES AND SYSTEMS

(71) Applicant: NIO USA, Inc., San Jose, CA (US)

(72) Inventors: Ming Fung Wong, San Jose, CA (US); Tamanna Nabar, Ithaca, NY (US)

(73) Assignee: NIO USA, Inc., San Jose, CA (US)

( * ) Notice: Subject to any disclaimer, the term of this patent is extended or adjusted under 35 U.S.C. 154(b) by 446 days.

(21) Appl. No.: 16/109,314

(22) Filed: Aug. 22, 2018

(65) Prior Publication Data

US 2020/0062029 A1    Feb. 27, 2020

(51) Int. Cl.
*B60B 7/20* (2006.01)
*B60B 7/04* (2006.01)

(52) U.S. Cl.
CPC .................. *B60B 7/20* (2013.01); *B60B 7/04* (2013.01); *B60B 2900/1216* (2013.01); *B60B 2900/513* (2013.01)

(58) Field of Classification Search
CPC ........... B60B 7/04; B60B 7/20; B60B 7/0073; B60B 7/008; B60B 7/0086; B60B 2900/1216; B60B 2900/513
See application file for complete search history.

(56) References Cited

U.S. PATENT DOCUMENTS

| 4,593,953 | A | * | 6/1986 | Baba | B60B 7/00 |
| | | | | | 301/37.101 |
| 7,661,766 | B2 | * | 2/2010 | Davis | B60B 19/10 |
| | | | | | 301/37.25 |
| 2009/0195053 | A1 | | 8/2009 | Kruse et al. | |
| 2013/0313889 | A1 | | 11/2013 | Schmid et al. | |
| 2014/0175858 | A1 | | 6/2014 | Platto et al. | |
| 2015/0069822 | A1 | | 3/2015 | Haase et al. | |
| 2017/0043616 | A1 | | 2/2017 | Wippler et al. | |
| 2018/0281510 | A1 | * | 10/2018 | Bach | B60B 7/18 |
| 2019/0322128 | A1 | * | 10/2019 | Yen | B60B 7/0086 |

FOREIGN PATENT DOCUMENTS

DE    102016001365    1/2017

* cited by examiner

*Primary Examiner* — Jason R Bellinger
(74) *Attorney, Agent, or Firm* — Sheridan Ross P.C.

(57) ABSTRACT

Methods and systems of an active aerodynamic wheel cap device are provided. The active aerodynamic wheel cap device can be mounted to a vehicle wheel and configured to actuate from a flap-open to a flap-closed state. The flap-open state provides an air vent path from an outer portion of a wheel to an internal component of the wheel, especially at low speeds or during braking. The flap-closed state provides a substantially gapless aerodynamic cap for the wheel of the vehicle at highway speeds or during acceleration. The actuation of the active aerodynamic wheel cap device may be based on an all-mechanical controlled centripetal force movement mechanism.

20 Claims, 6 Drawing Sheets

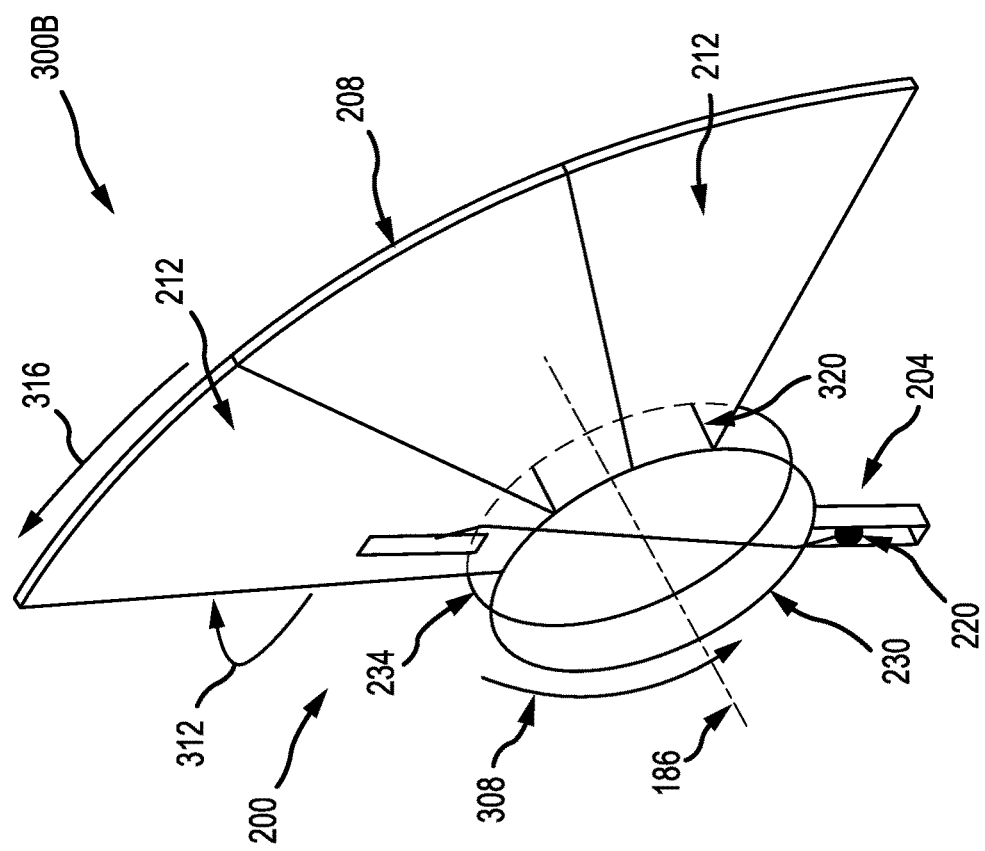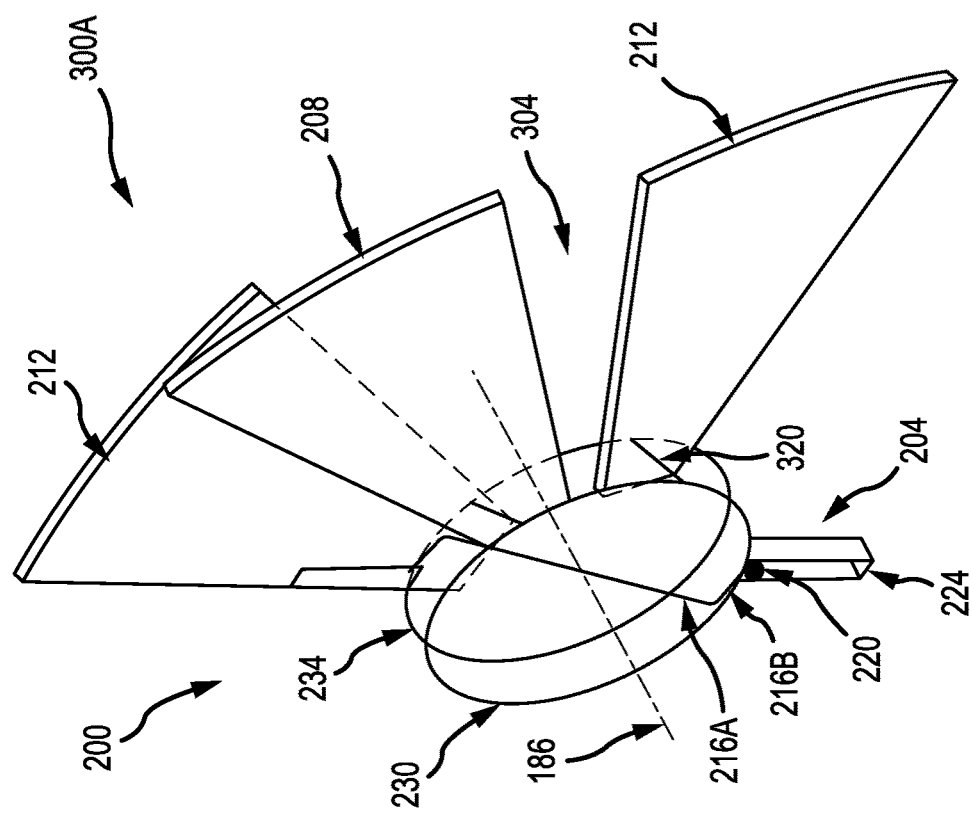

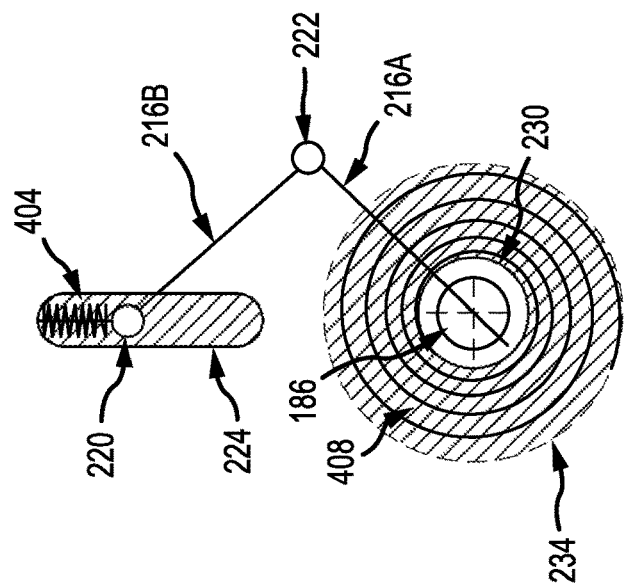
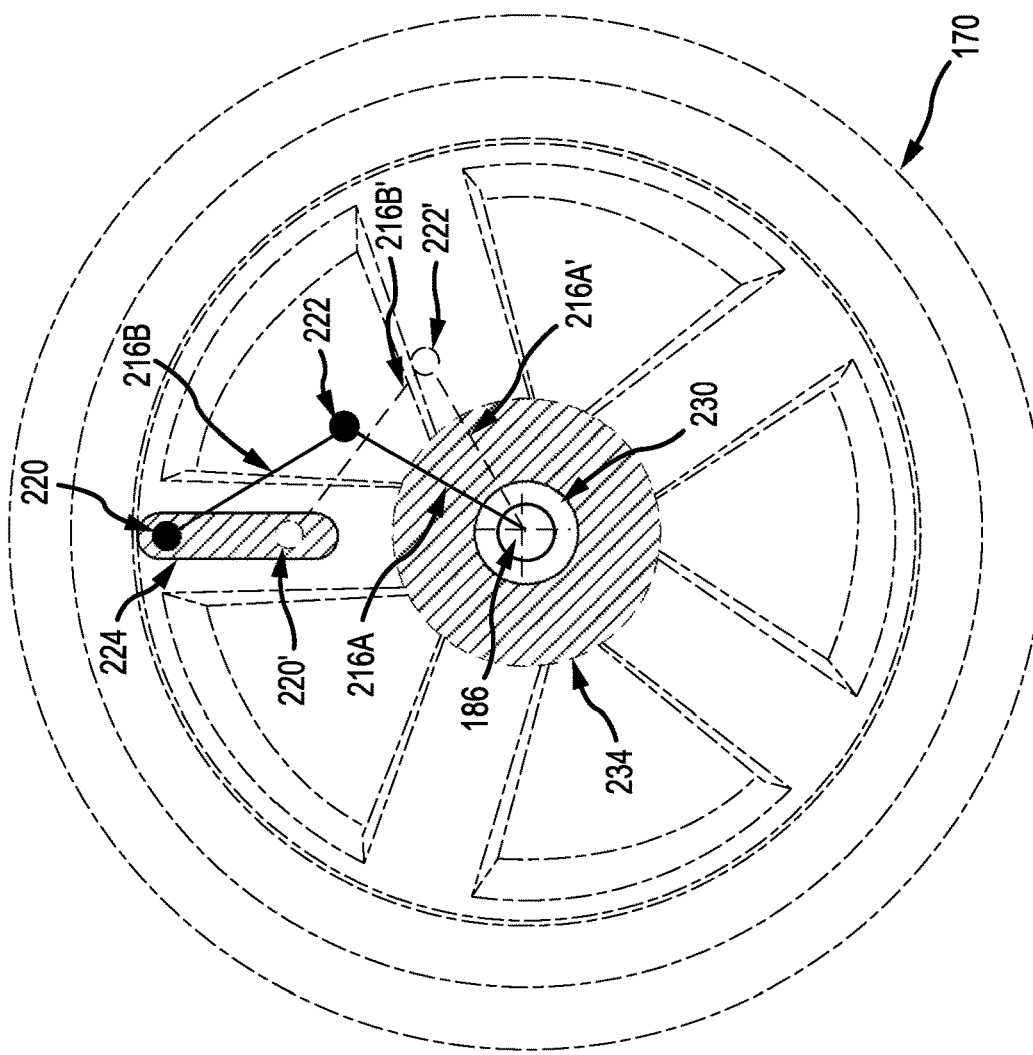
Fig. 4B
Fig. 4A

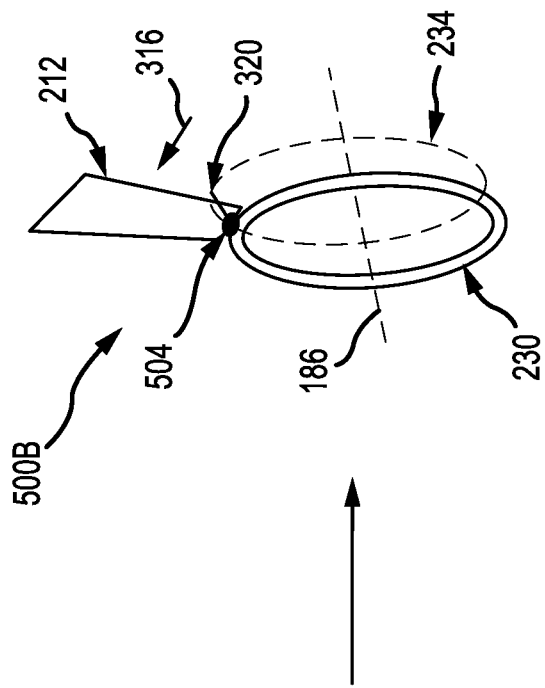
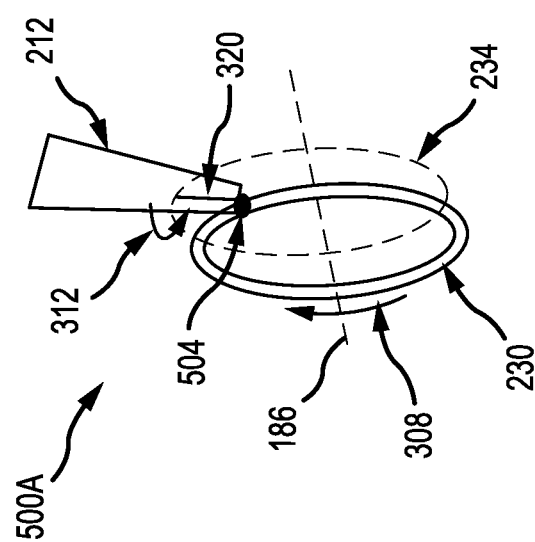

ACTIVE AERODYNAMIC WHEEL CAP DEVICES AND SYSTEMS

FIELD

The present disclosure is generally directed to vehicle wheel hub caps, in particular, toward velocity based mechanically deployable aerodynamic wheel caps for energy efficient vehicles.

BACKGROUND

Aerodynamic drag on a vehicle traveling at highway speeds contributes to a majority of the energy consumption required for both electric and internal combustion engine vehicles. One major source of aerodynamic drag in a vehicle can be attributed to the structure of the wheels of a vehicle. Typical vehicle wheels include a hub and a number of spokes joining the hub of the wheel to an outer rim of the wheel. In addition to providing a source of aerodynamic drag, the open area disposed in between the spokes of a wheel provides a cooling path for air moving past the vehicle while driving to pass through the open areas and, among other things, cool the braking components (e.g., brakes, calipers, disks, drums, etc.) of the vehicle. As the number of open areas in a wheel increases, or as the size of the open areas increases, the aerodynamic drag on the vehicle can increase proportionally. More aerodynamic vehicles may employ smaller open areas for brake cooling, while less aerodynamic vehicles may employ a larger open areas between spokes.

In an attempt to reduce the amount of aerodynamic drag in a vehicle, manufacturers have attempted to develop an actively-controllable wheel that closes and opens access to the open area of a wheel via computer control. In general, these actively-controllable wheels are electro-mechanically controlled when an actuation (e.g., opening or closing, etc.) is deemed necessary. Due to the complexity of these electro-mechanical devices, custom controls, and direction-specific fittings, prohibitively expensive equipment and tooling is required to implement the devices in a commercial vehicle application.

BRIEF DESCRIPTION OF THE DRAWINGS

FIG. 3A shows a detail perspective view of the active aerodynamic wheel cap device in a first actuation state in accordance with embodiments of the present disclosure;

FIG. 3B shows a detail perspective view of the active aerodynamic wheel cap device in a second actuation state in accordance with embodiments of the present disclosure;

FIG. 4A shows an elevation view of a centripetal actuation mechanism of the active aerodynamic wheel cap device in accordance with embodiments of the present disclosure;

FIG. 4B shows a schematic elevation view of the centripetal actuation mechanism of the active aerodynamic wheel cap device in accordance with embodiments of the present disclosure;

FIG. 5A shows a schematic perspective view of the active aerodynamic wheel cap device in a first actuation state in accordance with embodiments of the present disclosure; and FIG. 5B shows a schematic perspective view of the active aerodynamic wheel cap device in a second actuation state in accordance with embodiments of the present disclosure.

DETAILED DESCRIPTION

Figure 1:
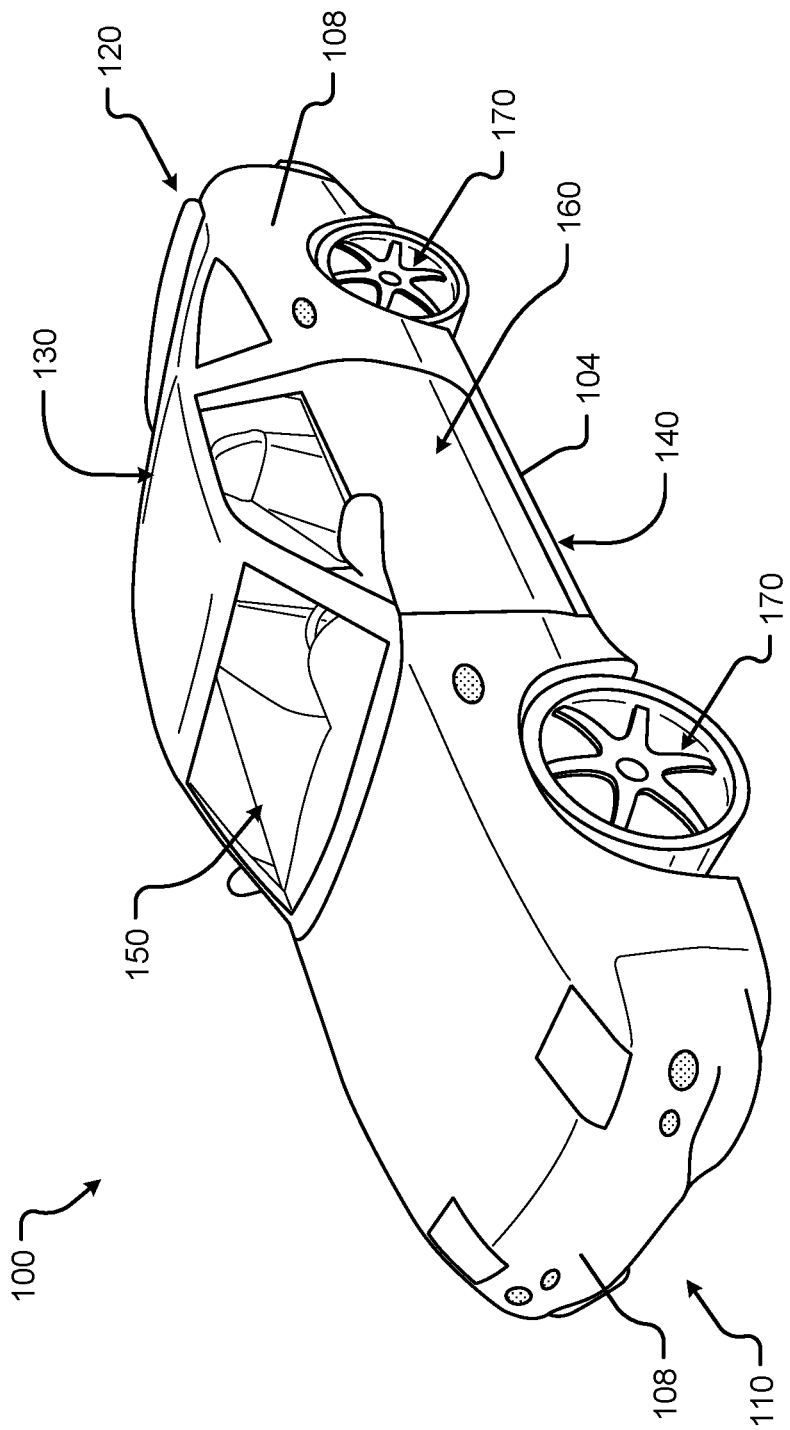
FIG. 1 shows a vehicle in accordance with embodiments of the present disclosure.

In some embodiments, the present disclosure describes a mechanical device that, among other things, eliminates the need for electro-mechanical components and associated controls for actively-controllable aerodynamic wheels. Additionally or alternatively, the present disclosure describes a universal device and mechanical system that does not require making dedicated wheels for each left-side and/or right-side of a vehicle. In one embodiment, the present disclosure provides a device that includes all of the movable aerodynamic wheel components into a single wheel cap or wheel attachment device. The wheel cap or device may provide a deployment of aerodynamic flaps that are configured to move based on a mechanical movement of the wheel about an axis while traveling (e.g., based on an angular velocity of the wheel, acceleration of the vehicle, and/or deceleration of the vehicle). As a result, the elements of the wheel caps may automatically actuate into a closed position to reduce aerodynamic drag at high-speed (e.g., via closing an open area between spokes of a wheel, etc.) and/or automatically actuate into an open position at low-speed, or during brake, etc. (e.g., via opening a path to the open area between the spokes of the wheel, etc.).

At least one benefit to the wheel caps disclosed herein includes a reduced manufacturing cost, as the wheel caps operate based on a mechanical movement and/or the dynamics of the wheel and are not based on computer control, electro-mechanical actuation, and/or combinations thereof. Embodiments of the active aerodynamic wheel cap device described herein can reduce aerodynamic drag caused by the spokes or other portions of the a vehicle wheel by closing an open area disposed between the spokes, and opening up the area to vent air to the brake components and other wheel assemblies when brake cooling is needed.

In some embodiments, the present disclosure describes removing the need for electro-mechanically actuated components and can avoid the need for making dedicated wheels, or wheel cap assemblies, for each left- and right-side of the vehicle. In one embodiment, the present disclosure packages all of the components necessary for the active aerodynamic wheel cap device to operate into a selectively attachable wheel cap. The deployment or actuation of aerodynamic flaps are mechanically operated by the angular velocity and/or deceleration of the wheel during travel at speed. The deployment mechanism of the active aerodynamic wheel cap device may selectively reduce aerodynamic drag at high speeds by, for example, closing or maintaining the aerodynamic flaps in a closed position during travel. The deployment mechanism of the active aerodynamic wheel cap device may cool the wheels and/or braking components by opening up the air vent path between spokes at low speeds or during a vehicle braking operation.

As can be appreciated, embodiments of the present disclosure allow for a separate, or add-on, component and/or active aerodynamic wheel cap device/system to be interconnected with a base vehicle wheel to provide the selective aerodynamic controls without affecting the manufacturing costs associated with each wheel.

Embodiments of the present disclosure will be described in connection with a wheel of a vehicle, and in some embodiments, an electric vehicle, rechargeable electric vehicle, and/or hybrid-electric vehicle and associated systems.

FIG. 1 shows a perspective view of a vehicle 100 in accordance with embodiments of the present disclosure. The electric vehicle 100 comprises a vehicle front 110, vehicle aft 120, vehicle roof 130, at least one vehicle side 160, a vehicle undercarriage 140, a vehicle interior 150, and one or more wheels 170. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not necessarily require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

Figure 2A:
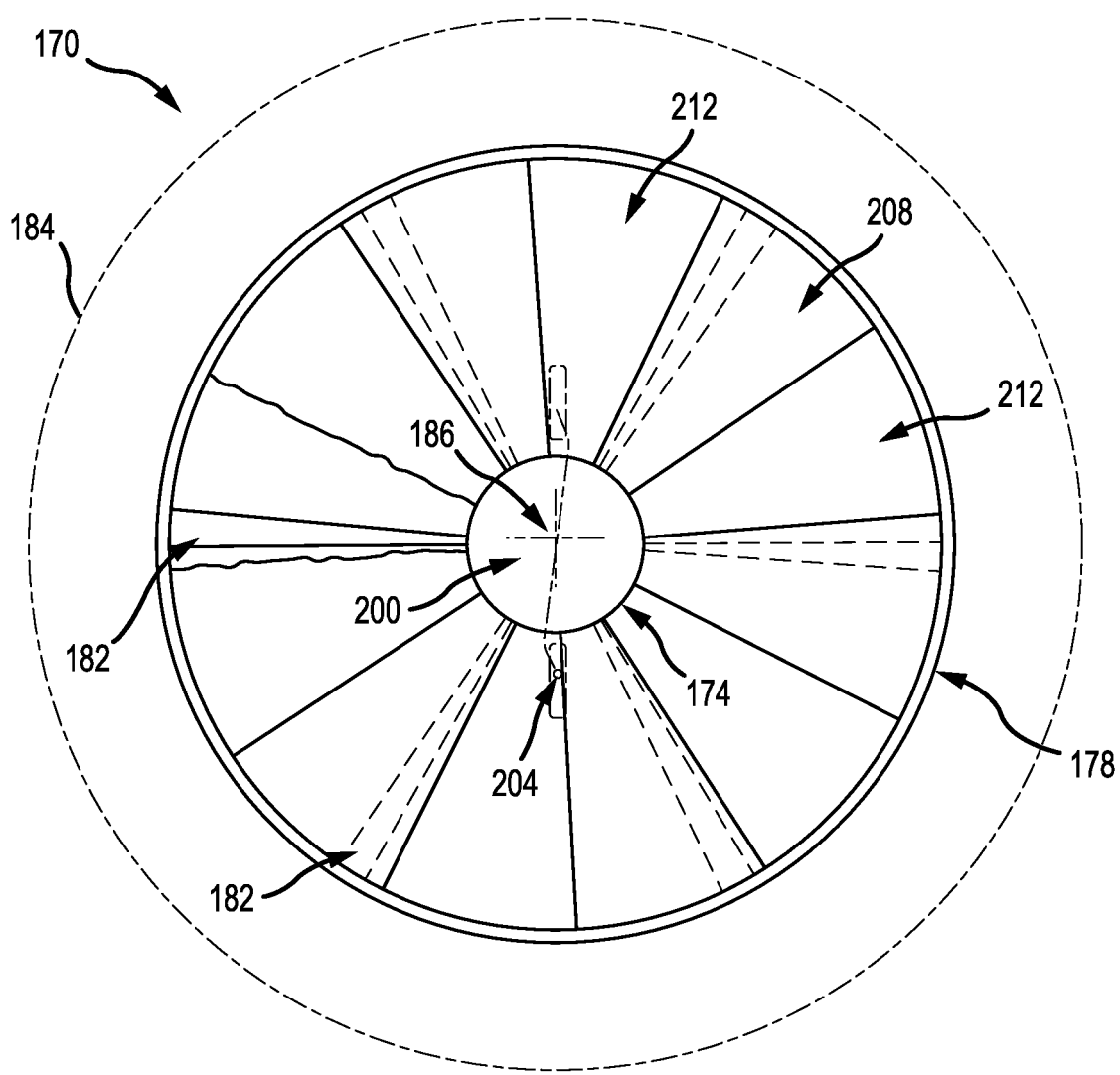
FIG. 2A shows an elevation view of an active aerodynamic wheel cap device attached to a vehicle wheel in accordance with embodiments of the present disclosure.
Figure 2B:
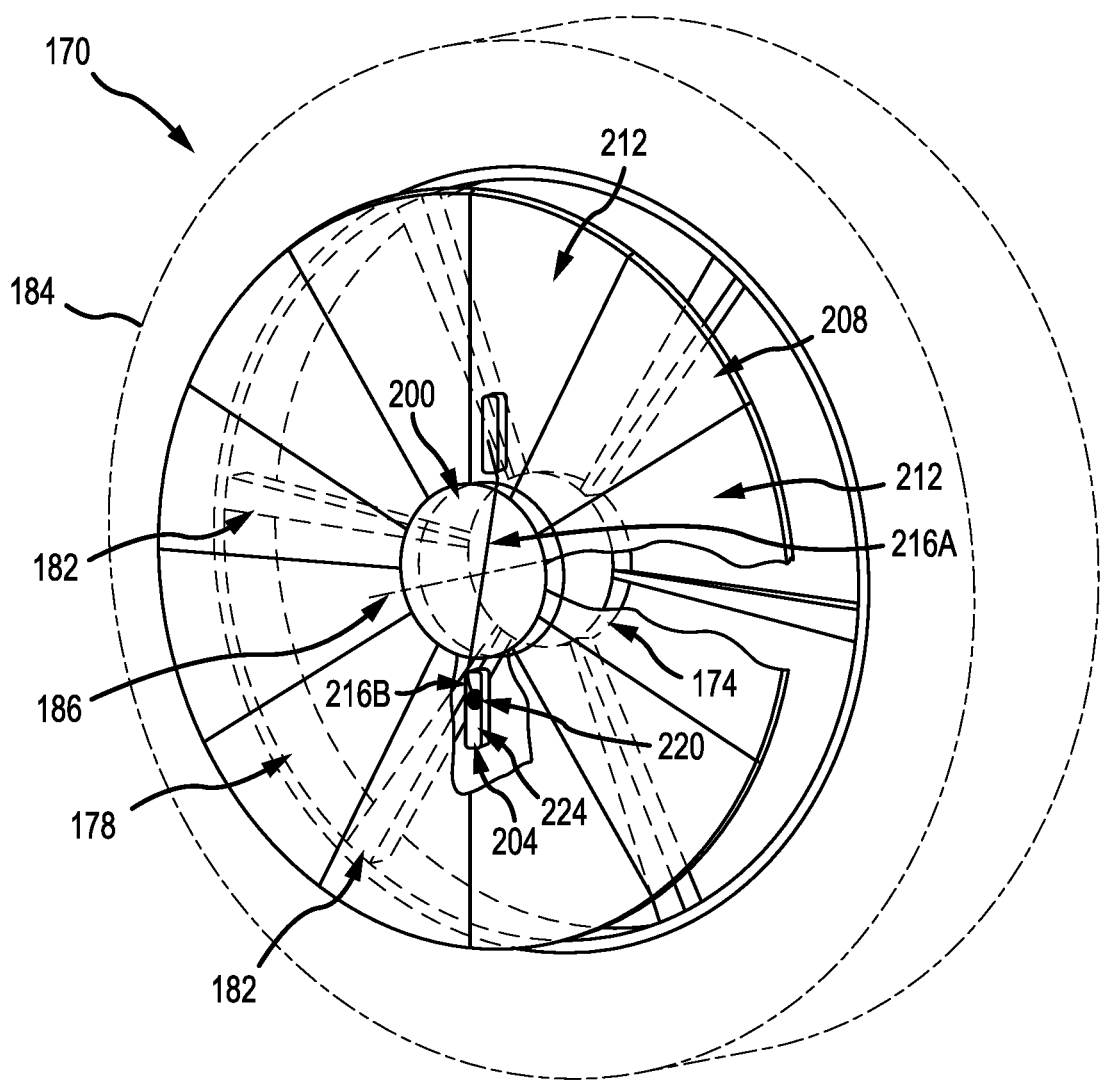
FIG. 2B shows a perspective view of an active aerodynamic wheel cap device attached to the vehicle wheel in accordance with embodiments of the present disclosure.

FIGS. 2A-2B show various views of an active aerodynamic wheel cap device 200 attached to a vehicle wheel 170 in accordance with embodiments of the present disclosure. The wheel 170 may include a central wheel hub 174, a wheel rim 178, and two or more spokes 182 connecting the wheel hub 174 to the wheel rim 178. In some embodiments, the wheel hub 174, wheel rim 178, and/or the spokes 182 of the wheel 170 may be formed from a single, or integral, material. For instance, these components may be machined, molded, additive layer manufactured (e.g., rapid prototyped, etc.), welded, or otherwise formed to make up the internal structure of the wheel 170. Examples of the wheel materials may include, but is in no way limited to, steel, aluminum, magnesium, iron, plastic, carbon fiber, fiberglass, other metals, etc., and/or alloys or combinations thereof. In some embodiments, a tire 184 may be attached to, or formed, in the wheel 170. FIG. 2A includes a broken section showing a spoke 182 of the wheel 170 disposed behind the active aerodynamic wheel cap device 200. In addition to a broken section showing a spoke 182 of the wheel 170, FIG. 2B includes a broken section (e.g., below the central wheel hub 174, etc.) showing a portion of a centripetal actuation mechanism in accordance with embodiments of the present disclosure.

The wheel 170 may be substantially symmetrical (e.g., rotationally symmetrical) about the center axis 186. The center axis 186 may run through the center of the wheel 170 and define an axis of rotation for the wheel 170. In some embodiments, the wheel 170 may be attached to a drive shaft, or axle, of the vehicle 100. The wheel 170 may rotate about the center axis 186 in a clockwise or a counterclockwise direction about the center axis 186 shown in FIG. 2A.

The active aerodynamic wheel cap device 200 may comprise a dynamic mechanism hub 230 interconnected with a static mechanism hub 234, or mount body. In one embodiment, the dynamic mechanism hub 230 may be rotationally interconnected with the static mechanism hub 234. In any event, the static mechanism hub 234 may be attached to the wheel hub 174 such that the active aerodynamic wheel cap device 200 moves in rotational unison with a rotation of the wheel. This attachment may include an affixed relationship between the static mechanism hub 234 and the wheel 170 and/or the wheel hub 174.

The active aerodynamic wheel cap device 200 may include a number of static flaps 208 and actives flap 212 arranged about the center axis 186. In one embodiment, the disposition and arrangement of the static flaps 208 and the active flaps 212 may alternate about the center axis 186. For instance, FIG. 2A shows one of the active flaps 212 disposed in a first position (e.g., corresponding to an approximate twelve o'clock position on the wheel 170, etc.), then one of the static flaps 208 disposed in a second position about the center axis 186 (e.g., corresponding to an approximate one o-clock position on the wheel 170, etc.), then one of the active flaps 212 disposed in a third position (e.g., corresponding to an approximate two o'clock position on the wheel 170, etc.), and so on, continuing around the center axis 186.

As described herein, the static flaps 208 may be attached to the static mechanism hub 234, such that a rotation of the wheel 170 causes the static flaps 208 to rotate along with, and dependent upon, the rotation of the wheel 170. In some embodiments, the active flaps 212 may be pivotally connected (e.g., at the flap pivot 504 shown in FIGS. 5A-5B) to the dynamic mechanism hub 230 that is rotationally attached to the static mechanism hub 234. Depending on the speed of the vehicle 100 while traveling, as the wheel 170 rotates about the center axis 186 (e.g., on a drive shaft, or axle, etc.), the active aerodynamic wheel cap device 200 may move the active flaps 212 relative to the static flaps 208 opening or closing a vent path to the braking components, etc., of the wheel 170. This rotational movement of the wheel 170 while traveling, as described in conjunction with FIGS. 3A-5B, may control a centripetal force that, via one or more elements and/or mechanisms of the active aerodynamic wheel cap device 200, and that moves the active flaps 212 (e.g., about the flap pivots 504, and/or the center axis 186, etc.) relative to the static flaps 208.

The active aerodynamic wheel cap device 200 may include at least one centripetal actuation mechanism 204 comprising a number of links (e.g., a primary link 216A, a secondary link 216B, etc.), and weights or masses (e.g., track mass 220, etc.), and guide tracks 224. In some embodiments, the primary link 216A may be rotationally connected to the active aerodynamic wheel cap device 200 at, or adjacent to, the static mechanism hub 234. For instance, a first end of the primary link 216A may be rotationally interconnected with the active aerodynamic wheel cap device 200 such that the primary link 216A may move in a controlled rotational path about the center axis 186. This rotation may be separate from, or in addition to, a rotation of the wheel 170. In one embodiment, the primary link 216A may move along with a rotation with the wheel 170 and further rotate in an additional clockwise or counterclockwise direction about the center axis 186. The other, or second, end of the primary link 216A may include an interconnection (e.g., pin, link, fastener, and/or other mechanical connection) to a portion of one or more of the active flaps 212 as well as a connection to a first end of a secondary link 216B. The secondary link 216B may be interconnected with a track mass 220 disposed at least partially in a mass translation channel or guide track 224. The secondary link 216B may rotate relative to the primary link 216A (e.g., at the connection thereto) and/or the track mass 220 (e.g., via a rotational interconnection, etc.). In one embodiment, one or more components of the centripetal actuation mechanism 204 may be disposed at least partially behind the dynamic mechanism hub 230 and/or the static mechanism hub 234 (e.g., in an area between the active aerodynamic wheel cap device 200 and the wheel hub 174, etc.).

The movement of the components making up the active aerodynamic wheel cap device 200 may be described relative to an angular velocity of the wheel 170 rotating about the center axis 186 (e.g., while a vehicle 100 is moving or otherwise traveling). As the angular velocity of the wheel 170 increases from a vehicle stopped position, where the wheel 170 is making no revolutions per minute (RPMs), to a vehicle traveling movement (e.g., where the wheel 170 is moving at approximately one or more RPMs), the track mass 220 may translate or move outwardly from the center of the wheel 170 and/or active aerodynamic wheel cap device 200 in a direction toward the wheel rim 178 guided by the guide track 224. As the track mass 220 moves outwardly from the center of the wheel 170, the primary link 216A (or the secondary link 216B) may push the active flaps 212, about their respective flap pivots, from an at least partially open (e.g., venting/cooling) position to a closed (e.g., aerodynamic) position.

The push force may be applied at the connection of the primary link 216A or the secondary link 216B to the active flaps 212. Because the connection between the primary link 216A or the secondary link 216B is disposed behind the active flaps 212 (e.g., between the wheel hub 174 and the active flaps 212 etc.), as the track mass 220 moves outwardly from the center of the wheel 170, the active flaps 212 may pivot (e.g., about flap pivot 504 shown in FIG. 5A) at least partially from the space behind the static flaps 208 into a position that is substantially coplanar with the static flaps 208.

Additionally or alternatively, the push force may rotate the dynamic mechanism hub 230 relative to the static mechanism hub 234 (e.g., about the center axis 186). This rotation may be in addition to the rotation of the active flaps 212 about their respective flap pivots. Among other things, this combined rotation allows each of the active flaps 212 to move from a position behind each of the respective adjacent static flaps 208 (e.g., as shown and described in conjunction with FIG. 3A) into a position where the active flaps 212 are substantially coplanar to the static flaps 208 (e.g., as shown and described in conjunction with FIG. 3B) closing the vent path or opening between spokes 182.

As can be appreciated, as the angular velocity of the wheel 170 decreases, the track mass 220 may move toward the center of the wheel 170. In this example, the push force described above may be replaced by a pull force (e.g., acting in an opposite direction to the push force) moving the each of the active flaps 212 from a position coplanar, or substantially coplanar, with each of the respective adjacent static flaps 208 (e.g., as shown and described in conjunction with FIG. 3B) into a position where each of the active flaps 212 are disposed at least partially behind a portion of the static flaps 208 (e.g., as shown and described in conjunction with FIG. 3A) opening the vent path or opening between spokes 182.

In some embodiments, the active aerodynamic wheel cap device 200 may be sensitive to both angular velocity and angular deceleration of the vehicle 100 and change its aerodynamic shape when it passes a threshold value of angular velocity or deceleration. This threshold value may be predetermined by one or more springs (e.g., compression springs, torsion springs, leaf springs, etc.) disposed in the guide track 224 and/or in mechanical communication between the dynamic mechanism hub 230 and the static mechanism hub 234, having predetermined spring coefficients or spring rates. In any of the embodiments described herein the active aerodynamic wheel cap device 200 can be mounted on the wheel 170 as required. This selective mount option gives user the flexibility of using the active aerodynamic wheel cap device 200 as required or desired. Embodiments of the active aerodynamic wheel cap device 200 and corresponding mechanisms are entirely mechanically-driven and, thus, inexpensive to manufacture or implement. Although one or more centripetal actuation mechanisms 204 are illustrated and described in conjunction with the active aerodynamic wheel cap devices 200 shown, it should be appreciated that the active aerodynamic wheel cap device 200 may employ any number of centripetal actuation mechanisms 204 to match or actuate corresponding active flaps 212 (e.g., individually or in sets, etc.).

The active aerodynamic wheel cap device 200 described herein may at least include a closed state and an open state of the active flaps 212 depending on the actuation state (e.g., angular velocity of the wheel 170, etc., rotating about the center axis 186). In some embodiments, the active aerodynamic wheel cap device 200 may include an at least partially closed or open state of the active flaps 212 relative to the static flaps 208.

At high-velocity (e.g., highway vehicle speeds, speeds greater than 40 miles per hour (MPH), speeds greater than 50 MPH, etc.), the centripetal actuation mechanism 204 may cause the dynamic mechanism hub 230 to rotate about the center axis 186 in a closed state. In one example, the dynamic mechanism hub 230 may be rotated counterclockwise about the center axis 186. This rotation enables the active flaps 212 to rotate about the center axis 186 (of the wheel) such that the active flaps 212 align with each other to substantially close all openings or gaps between the spokes 182. In the closed state, the active aerodynamic wheel cap device 200 may close the active flaps 212 relative to the static flaps 208 making the wheel 170 more aerodynamically suitable for high speeds than compared to a wheel 170 without the active aerodynamic wheel cap device 200 and/or with the active aerodynamic wheel cap device 200 in an open state.

At low-velocity (e.g., off-highway vehicle speeds, speeds lower than 40 MPH, speeds lower than 30 MPH, etc.) or when decelerating or braking is applied (at high-velocity), the centripetal actuation mechanism 204 may cause the dynamic mechanism hub 230 to rotate about the center axis 186 in an open state (e.g., in a direction opposite that of the high-velocity direction describe above). Continuing the example provided above, the dynamic mechanism hub 230 may be rotated clockwise about the center axis 186. This rotation enable the active flaps 212 to rotate about the center axis 186 (of the wheel 170) such that the active flaps 212 open, providing gaps between spokes 182. These gaps may provide an air vent path for the wheel 170 and/or brake components, serving as air conditioning or cooling vents for the various components associated with the wheel 170, the brakes, a portion of the drivetrain, etc. In some embodiments, this rotation may open the active flaps 212 of the active aerodynamic wheel cap device 200 providing for cooling when the brake of the vehicle 100 is applied. In the open state, the shape and appearance of the active aerodynamic wheel cap device 200 may appear to be a traditional open wheel cap, especially when the vehicle 100 is moving at low speeds. As described above, this flap-opening action is a combined rotational movement. The active flaps 212 can be moved from the open position to the closed position closing the air gap, and vice versa, as described herein.

FIGS. 3A-3B show detail perspective views of the active aerodynamic wheel cap device 200 in various actuation states in accordance with embodiments of the present disclosure. In particular, FIG. 3A shows the active aerodynamic wheel cap device 200 in a first actuation state 300A and FIG. 3B shows the active aerodynamic wheel cap device 200 in a second actuation state 300B. The flap-open state 300A of FIG. 3A may correspond to the low-speed, or open, state described above. The flap-closed state 300B of FIG. 3B may correspond to the high-speed, or closed, state described above.

As shown in FIGS. 3A-3B, the dynamic mechanism hub 230 may be disposed in a position offset (e.g., along the center axis 186 direction) a distance from the static mechanism hub 234. In some embodiments, the active flaps 212 may be pivotally attached to the dynamic mechanism hub 230 and the static flaps 208 may be attached to (or fixed relative to) the static mechanism hub 234. In this manner, as the dynamic mechanism hub 230 rotates relative to the static mechanism hub 234, the active flaps 212 may move relative to the static flaps 208. In some embodiments, the dynamic mechanism hub 230 may be rotationally interconnected to the static mechanism hub 234 via one or more hub links 320. Examples of the hub links 320 may include, but are in no way limited to, one or more flexures, torsion members, arms, tie rods, etc., and/or other physical elements and/or structures joining the dynamic mechanism hub 230 to the static mechanism hub 234 and allowing for rotation of the dynamic mechanism hub 230 relative to the static mechanism hub 234 (e.g., in a direction of rotation about the center axis 186 of the wheel 170 and/or active aerodynamic wheel cap device 200).

In FIG. 3A, the dynamic mechanism hub 230 is shown rotated about the center axis 186 relative to the static mechanism hub 234 such that a representative active flap 212 is disposed at least partially behind an adjacent static flap 208. In the flap-open state 300A the active flaps 212 are pivotally rotated about the flap pivot 504 and rotated with the dynamic mechanism hub 230. In the flap-open state 300A, the active aerodynamic wheel cap device 200 provides at least one airflow access opening 304, or vent path, to one or more components of the wheel 170, the braking system of the vehicle 100, the drivetrain of the vehicle 100, and/or other components of the vehicle 100. In some embodiments, the active aerodynamic wheel cap device 200 may provide an airflow access opening 304 between each of the static flaps 208 of the active aerodynamic wheel cap device 200 in the flap-open state 300A.

In the flap-open state 300A, the track mass 220 may be disposed in a position of the guide track 224 closer to the center of the wheel than when in the flap-closed state 300B. In this open position of active flaps 212, the connection between the active flaps 212 and the primary link 216A or the secondary link 216B may provide a biasing force (e.g., a pull force) against the active flaps 212 maintaining the active flaps 212 in the open position.

As described above, when the wheel 170 of the vehicle 100 (having the active aerodynamic wheel cap device 200 attached thereto) rotates at a predetermined angular velocity about the center axis 186, the centripetal force caused by the rotation moves the track mass 220 along the guide track 224 outwardly from the center of the wheel. This translation of the track mass 220 moves the connection point of the linkage 216A, 216B closer to the dynamic mechanism hub 230, in turn, moving the active flaps 212 from a flap-open state 300A to a flap-closed state 300B. In particular, the translation of the track mass 220 moves the dynamic mechanism hub 230 in the dynamic hub rotation direction 308 (along with moving the active flaps 212 in the active flap movement direction 316), while rotating the active flaps 212 in the active flap pivot direction 312. In the flap-closed state 300B show in FIG. 3B, the active flaps 212 may be arranged substantially coplanar with, or substantially parallel to and offset from, the static flaps 208. As shown in FIG. 3B, the airflow access opening 304 is closed by the closing of the active flaps 212 (providing an aerodynamic wheel 170 for a vehicle 100).

In some embodiments, when the angular velocity is decreased from the predetermined angular velocity described above (e.g., during deceleration or braking), the active flaps 212 may move from the flap-closed state 300B to the flap-open state 300A. The flap-open state 300A may provide a component cooling (e.g., non-aerodynamic) arrangement of the active flaps 212 of the active aerodynamic wheel cap device 200.

Referring now to FIG. 4A, an elevation view of a centripetal actuation mechanism 204 of the active aerodynamic wheel cap device 200 is shown in accordance with embodiments of the present disclosure. The centripetal actuation mechanism 204 shown in FIG. 4A may correspond to the centripetal actuation mechanism 204 described above, or vice versa. For instance, the centripetal actuation mechanism 204 described in conjunction with FIGS. 4A-4B may be part of the active aerodynamic wheel cap device 200 described in conjunction with FIGS. 1-3B, and vice versa.

FIG. 4A shows a schematic view of the centripetal actuation mechanism 204 when the active aerodynamic wheel cap device 200 is in multiple states. The primary link 216A and the secondary link 216B of the centripetal actuation mechanism 204 are interconnected to one another at link joint 222. A first end of the primary link 216A is connected at or about the center axis 186 of the active aerodynamic wheel cap device 200, while the second end of the primary link 216A is connected to a first end of the secondary link 216B at the link joint 222. The other, or second, end of the secondary link 216B is connected to the track mass 220, as described herein. The track mass 220 is configured to move in the guide track 224 as the wheel 170 rotates about the center axis 186. In some embodiments, the track mass 220 may correspond to a cam follower, roller bearing, pin, bearing, or other object that can move within the guide track 224. The guide track 224 may be a cam, slot, channel, track, etc., and/or other feature or set of features that are configured to guide or control a translation of the track mass 220 in any configuration.

In FIG. 4A, the centripetal actuation mechanism 204 shows the linkages 216A, 216B and track mass 220 when the active aerodynamic wheel cap device 200 is in a flap-open state 300A and a flap-closed state 300B. For example, in the flap-closed state 300B the track mass 220 is in a furthermost position in the guide track 224 from the center of the wheel 170 and active aerodynamic wheel cap device 200. In this position, the distance from the center axis 186 to the track mass 220 is greater than the distance from the center axis 186 to the track mass 220 when the active aerodynamic wheel cap device 200 is in the flap-open state 300A. In one embodiment, the primary link 216A may rotate from the position shown in the flap-closed state 300B (e.g., clockwise about the center axis 186) to the position of the primary link 216A' shown in the flap-open state 300A. As can be appreciated, the secondary link 216B may rotate from the position shown in the flap-closed state 300B (e.g., counterclockwise from, or about, the link joint 222) to the position of the secondary link 216B' shown in the flap-open state 300A. In the flap-open state 300A, the track mass 220 moves along the guide track 224 toward the center of the wheel 170 and the active aerodynamic wheel cap device 200 to the open position of the track mass 220' and the link joint 222 moves to the open position of the link joint 222'.

FIG. 4B shows a schematic elevation view of the centripetal actuation mechanism 204 of the active aerodynamic wheel cap device 200 in accordance with embodiments of the present disclosure. As disclosed above, the active aerodynamic wheel cap device 200 and the centripetal actuation mechanism 204 may include one or more compression springs, torsion springs, leaf springs, etc. to bias the active flaps 212 into a particular open or close state. As shown in FIG. 4B, the track compression spring 404 and/or the dynamic hub torsion spring 408 may bias the track mass 220 and the primary link 216A of the active aerodynamic wheel cap device 200, respectively, into a flap-open state 300A. In one embodiment, the dynamic hub torsion spring 408 may bias the dynamic mechanism hub 230 in a position relative to the static mechanism hub 234. In any event, the biased state may correspond to a default, normal, or nominal, state for the active aerodynamic wheel cap device 200 (e.g., installed with a wheel 170).

In one embodiment, the track compression spring 404 may be disposed at least partially within the guide track 224. The track compression spring 404 may provide a resistive force against the track mass 220 translating in the guide track 224. For example, the track compression spring 404 may push the track mass 220 and linkage 216A, 216B in a flap-open state 300A or in a flap partially-open state. In this arrangement, as the angular velocity of the wheel 170 increases, the force of the track mass 220 may overcome the spring force of the track compression spring 404, compressing the track compression spring 404, and allowing the track mass 220 to move outwardly from the center of the wheel 170 in the guide track 224 (e.g., moving the active flaps 212 into a flap-closed state 300B).

The dynamic hub torsion spring 408 may be disposed between the static mechanism hub 234 and the dynamic mechanism hub 230 as shown in FIG. 4B. The dynamic hub torsion spring 408 may similarly bias the active flaps 212 into a flap-open state 300A as the track compression spring 404. However, the dynamic hub torsion spring 408 may act upon the dynamic mechanism hub 230 rather than acting upon the track mass 220. For example, one end of the dynamic hub torsion spring 408 may be fixed relative to the static mechanism hub 234 and the other end of the dynamic hub torsion spring 408 may be attached to the static mechanism hub 234. The dynamic hub torsion spring 408 may be disposed at least partially about the center axis 186 of the active aerodynamic wheel cap device 200 and may cause a rotational spring torsion about the center axis 186 for the active aerodynamic wheel cap device 200.

FIGS. 5A-5B show schematic perspective views of the active aerodynamic wheel cap device 200 in various actuation states 500A, 500B in accordance with embodiments of the present disclosure. In particular FIG. 5A shows the active aerodynamic wheel cap device 200 in the flap-open state 500A and FIG. 5B snows the active aerodynamic wheel cap device 200 in the flap-closed state 500B. In FIG. 5A, the active flap 212 is shown pivoted about the flap pivot 504 into an area between the dynamic mechanism hub 230 and the static mechanism hub 234. The active flap pivot direction 312 shows the rotation in one direction about the flap pivot 504 for the active flap 212 and the dynamic hub rotation direction 308 of the dynamic mechanism hub 230 relative to the static mechanism hub 234. As described herein, the flap pivot 504 may comprise a hinge, a pin disposed in a receptacle (e.g., a hole, etc.), a rotating element, a bearing connection, a pin and bushing, and/or some other rotating interconnection. In any event, the hub link 320 connected to both the dynamic mechanism hub 230 and the static mechanism hub 234 is shown angularly displaced relative to the static mechanism hub 234 (e.g., highlighting that the dynamic mechanism hub 230 is rotated relative to the static mechanism hub 234). In some embodiments, the dynamic mechanism hub 230 may be offset a first distance from the static mechanism hub 234 in the flap-open state 300A of FIG. 5A.

Under low-speed operations (e.g., low vehicle speeds) the static mechanism hub 234 and the dynamic mechanism hub 230 may rotate in unison about the center axis 186. For instance, the static mechanism hub 234 and the dynamic mechanism hub 230 may be synchronized to move about the center axis 186 with all of the active flaps 212 maintained in an open position. Once the wheel 170 reaches a particular angular velocity (e.g., at higher vehicle speeds, highway speeds, accelerating, etc.) the dynamic mechanism hub 230 may rotate in a direction opposite the dynamic hub rotation direction 308 shown in FIG. 5A. The static mechanism hub 234 may be fixed to rotation of the wheel 170 while the dynamic mechanism hub 230 may rotate in unison with and/or separately from the rotation of the wheel 170. This rotation is shown by the reduced angular displacement of the hub link 320 in FIG. 5B. In turn, the active flaps 212 may move in the active flap movement direction 316 to a flap-closed state 500B. In some embodiments, the dynamic mechanism hub 230 may be offset a second different distance from the static mechanism hub 234 in the flap-closed state 300B shown in FIG. 5B (e.g., where the dynamic mechanism hub 230 is disposed a distance further from the static mechanism hub 234 in the flap-closed state 500B than when in the flap-open state 500A).

Embodiments of the present disclosure may be applied to any wheel design, wheel cap design, wheel cap mounting mechanism, number of spokes on the wheel cap, number of moving caps, and/or any number of linkages or sets of linkages in the wheel cap. The wheel caps described herein may have one or more sets of flap deployment linkages and/or moving hubs for different cosmetic designs and/or visual effects.

The exemplary systems and methods of this disclosure have been described in relation to aerodynamic wheel caps and vehicle wheels. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include an active aerodynamic wheel cap device, comprising: at least two static wheel cap flaps; a static mechanism hub configured to fixedly attach to a vehicle wheel, wherein the at least two static wheel cap flaps are fixedly coupled to the static mechanism hub and radially separated from one another by a gap distance; an active wheel cap flap that fits in the gap distance and moves relative to the at least two static wheel cap flaps; a dynamic mechanism hub offset from and rotationally interconnected with the static mechanism hub, wherein the active wheel cap flap is connected to the dynamic mechanism hub at a pivot point; and a flap actuation mechanism comprising: a guide track; an actuation mass that translates at least partially in the guide track from a first position adjacent to a center of the static mechanism hub to a second position disposed further from the center of the static mechanism hub than the first position; and a linkage connecting the actuation mass to a portion of the active wheel cap flap; wherein the active wheel cap flap is rotated about the pivot point and disposed at least partially behind one of the at least two static wheel cap flaps in the first position, and wherein the active wheel cap flap is disposed substantially coplanar with the at least two static wheel cap flaps in the second position.

Aspects of the above device include wherein an opening in the gap distance between the at least two static wheel cap flaps is exposed in the first position, and wherein the opening in the gap distance between the at least two static wheel cap flaps is covered by the active wheel cap flap in the second position. Aspects of the above device include wherein the linkage further comprises: a first link having a first end and a second end, the first end of the first link extending radially outward from a center of the static mechanism hub to the second end of the first link, wherein the first link is rotationally interconnected to the static mechanism hub at the first end of the first link; and a second link having a first end and a second end, wherein the first end of the second link is rotationally connected to the second end of the first link, and wherein the second end of the second link is rotationally connected to the actuation mass; wherein the actuation mass translates from the first position to the second position as the static mechanism hub and the vehicle wheel rotate in unison at a predetermined angular velocity about a center axis of the vehicle wheel. Aspects of the above device include wherein centripetal force generated by the vehicle wheel rotating at or above the predetermined angular velocity about the center axis moves the actuation mass in a direction outwardly from the center axis of the vehicle wheel to the second position. Aspects of the above device include wherein a decrease in centripetal force generated by the vehicle wheel rotating below the predetermined angular velocity about the center axis moves the actuation mass in a direction toward the center axis of the vehicle wheel to the first position. Aspects of the above device include wherein a compression spring is arranged adjacent to the guide track and configured to bias the actuation mass in the first position. Aspects of the above device include wherein a torsion spring is disposed between the static mechanism hub and the dynamic mechanism hub, and wherein the torsion spring is configured to bias the actuation mass in the first position via a translation of torsional spring forces generated by the torsion spring and provided through the linkage. Aspects of the above device include wherein the flap actuation mechanism is disposed behind the at least two static wheel cap flaps by an offset distance, and wherein a link joint connects the linkage to the active wheel cap flap. Aspects of the above device include wherein the dynamic mechanism hub is rotationally interconnected with the static mechanism hub via a hub link. Aspects of the above device include wherein the hub link is a flexure, and wherein the dynamic mechanism hub is disposed closer to the static mechanism hub in the first position than in the second position.

Embodiments include an active aerodynamic wheel cap flap actuation device, comprising: a mount body configured to fixedly attach to a vehicle wheel, wherein the mount body includes a plurality of vehicle wheel spoke cover flaps coupled thereto and disposed radially around a center of the mount body, and wherein each adjacent pair of the plurality of vehicle wheel spoke cover flaps are separated by a gap distance; a dynamic mechanism hub offset from and rotationally interconnected with the mount body, wherein the dynamic mechanism hub includes at least one pivot contact configured to interconnect with a receiving feature of an active wheel cap flap; a guide track disposed a distance from the center of the mount body; an actuation mass that translates at least partially in the guide track from a first position adjacent to the center of the mount body to a second position disposed further from the center of the mount body than the first position; and a linkage connecting the actuation mass and configured to connect to a portion of the active wheel cap flap; wherein the active wheel cap flap is rotated about the at least one pivot contact and disposed at least partially behind one of the plurality of vehicle wheel spoke cover flaps in the first position, and wherein the active wheel cap flap is disposed substantially coplanar with the plurality of vehicle wheel spoke cover flaps in the second position.

Aspects of the above device include wherein the active wheel cap flap is pivotally attached to the pivot contact of the dynamic mechanism hub, and wherein an opening in the gap distance between the plurality of vehicle wheel spoke cover flaps is exposed in the first position, and wherein the opening in the gap distance between the plurality of vehicle wheel spoke cover flaps is covered by the active wheel cap flap in the second position. Aspects of the above device include wherein the linkage further comprises: a first link having a first end and a second end, the first end of the first link extending radially outward from a center of the mount body to the second end of the first link, wherein the first link is rotationally interconnected to the mount body at the first end of the first link; and a second link having a first end and a second end, wherein the first end of the second link is rotationally connected to the second end of the first link, and wherein the second end of the second link is rotationally connected to the actuation mass; wherein the actuation mass translates from the first position to the second position as the mount body and the vehicle wheel rotate in unison at a predetermined angular velocity about a center axis of the vehicle wheel. Aspects of the above device include wherein centripetal force generated by the vehicle wheel rotating at or above the predetermined angular velocity about the center axis moves the actuation mass in a direction outwardly from the center axis of the vehicle wheel to the second position. Aspects of the above device include wherein a decrease in centripetal force generated by the vehicle wheel rotating below the predetermined angular velocity about the center axis moves the actuation mass in a direction toward the center axis of the vehicle wheel to the first position. Aspects of the above device include wherein Aspects of the above device include wherein a compression spring is arranged adjacent to the guide track and configured to bias the actuation mass in the first position. Aspects of the above device include wherein Aspects of the above device include wherein a torsion spring is disposed between the mount body and the dynamic mechanism hub, and wherein the torsion spring is configured to bias the actuation mass in the first position via a translation of torsional spring forces generated by the torsion spring and provided through the linkage. Aspects of the above device include wherein the linkage is disposed behind the at least two static wheel cap flaps by an offset distance, and wherein a link joint connects the linkage to the active wheel cap flap.

Embodiments include a vehicle wheel and aerodynamic wheel cap assembly, comprising: a wheel hub disposed at the center of the vehicle wheel and including a center axis running therethrough; a wheel rim concentric to and completely surrounding the wheel hub; a plurality of spokes radially extending from the wheel hub and connecting the wheel hub to the wheel rim; a wheel cap device, comprising: at least two static wheel cap flaps aligned to cover a portion of each of the plurality of spokes; a static mechanism hub fixedly attached to the vehicle wheel, wherein the at least two static wheel cap flaps are fixedly coupled to the static mechanism hub and radially separated from one another by a gap distance; an active wheel cap flap that fits in the gap distance and moves relative to the at least two static wheel cap flaps; a dynamic mechanism hub offset from and rotationally interconnected with the static mechanism hub, wherein the active wheel cap flap is connected to the dynamic mechanism hub at a pivot point; and a flap actuation mechanism comprising a guide track, an actuation mass that translates at least partially in the guide track from a first position adjacent to a center of the static mechanism hub to a second position disposed further from the center of the static mechanism hub than the first position, and a linkage connecting the actuation mass to a portion of the active wheel cap flap; wherein the active wheel cap flap is rotated about the pivot point and disposed at least partially behind one of the at least two static wheel cap flaps in the first position, and wherein the active wheel cap flap is disposed substantially coplanar with the at least two static wheel cap flaps in the second position.

Aspects of the above assembly include wherein an opening in the gap distance between the at least two static wheel cap flaps is exposed in the first position providing an air vent path between and through the plurality of spokes, and wherein the opening in the gap distance between the at least two static wheel cap flaps is covered by the active wheel cap flap in the second position.

Any one or more of the aspects/embodiments as substantially disclosed herein.

Any one or more of the aspects/embodiments as substantially disclosed herein optionally in combination with any one or more other aspects/embodiments as substantially disclosed herein.

One or more means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:
1. An active aerodynamic wheel cap device, comprising:
at least two static wheel cap flaps;
a static mechanism hub configured to fixedly attach to a vehicle wheel, wherein the at least two static wheel cap flaps are fixedly coupled to the static mechanism hub and radially separated from one another by a gap distance;
an active wheel cap flap that fits in the gap distance and moves relative to the at least two static wheel cap flaps;
a dynamic mechanism hub offset from and rotationally interconnected with the static mechanism hub, wherein the active wheel cap flap is connected to the dynamic mechanism hub at a pivot point; and
a flap actuation mechanism comprising:
a guide track;
an actuation mass that translates at least partially in the guide track from a first position adjacent to a center of the static mechanism hub to a second position disposed further from the center of the static mechanism hub than the first position; and
a linkage connecting the actuation mass to a portion of the active wheel cap flap;
wherein the active wheel cap flap is rotated about the pivot point and disposed at least partially behind one of the at least two static wheel cap flaps in the first position, and wherein the active wheel cap flap is disposed substantially coplanar with the at least two static wheel cap flaps in the second position.

2. The device of claim 1, wherein an opening in the gap distance between the at least two static wheel cap flaps is exposed in the first position, and wherein the opening in the gap distance between the at least two static wheel cap flaps is covered by the active wheel cap flap in the second position.

3. The device of claim 2, wherein the linkage further comprises:
   a first link having a first end and a second end, the first end of the first link extending radially outward from a center of the static mechanism hub to the second end of the first link, wherein the first link is rotationally interconnected to the static mechanism hub at the first end of the first link; and
   a second link having a first end and a second end, wherein the first end of the second link is rotationally connected to the second end of the first link, and wherein the second end of the second link is rotationally connected to the actuation mass;
   wherein the actuation mass translates from the first position to the second position as the static mechanism hub and the vehicle wheel rotate in unison at a predetermined angular velocity about a center axis of the vehicle wheel.

4. The device of claim 3, wherein centripetal force generated by the vehicle wheel rotating at or above the predetermined angular velocity about the center axis moves the actuation mass in a direction outwardly from the center axis of the vehicle wheel to the second position.

5. The device of claim 4, wherein a decrease in centripetal force generated by the vehicle wheel rotating below the predetermined angular velocity about the center axis moves the actuation mass in a direction toward the center axis of the vehicle wheel to the first position.

6. The device of claim 5, wherein a compression spring is arranged adjacent to the guide track and configured to bias the actuation mass in the first position.

7. The device of claim 5, wherein a torsion spring is disposed between the static mechanism hub and the dynamic mechanism hub, and wherein the torsion spring biases the actuation mass in the first position.

8. The device of claim 5, wherein the flap actuation mechanism is disposed behind the at least two static wheel cap flaps by an offset distance, and wherein a link joint connects the linkage to the active wheel cap flap.

9. The device of claim 5, wherein a hub link rotationally interconnects the dynamic mechanism hub with the static mechanism hub.

10. The device of claim 9, wherein the dynamic mechanism hub is disposed closer to the static mechanism hub in the first position than in the second position.

11. An active aerodynamic wheel cap flap actuation device, comprising:
    a mount body configured to fixedly attach to a vehicle wheel, wherein the mount body includes a plurality of vehicle wheel spoke cover flaps coupled thereto and disposed radially around a center of the mount body, and wherein each adjacent pair of the plurality of vehicle wheel spoke cover flaps are separated by a gap distance;
    a dynamic mechanism hub offset from and rotationally interconnected with the mount body, wherein the dynamic mechanism hub includes at least one pivot contact configured to interconnect with a receiving feature of an active wheel cap flap;
    a guide track disposed a distance from the center of the mount body;
    an actuation mass that translates at least partially in the guide track from a first position adjacent to the center of the mount body to a second position disposed further from the center of the mount body than the first position; and
    a linkage connecting the actuation mass and configured to connect to a portion of the active wheel cap flap;
    wherein the active wheel cap flap is rotated about the at least one pivot contact and disposed at least partially behind one of the plurality of vehicle wheel spoke cover flaps in the first position, and wherein the active wheel cap flap is disposed substantially coplanar with the plurality of vehicle wheel spoke cover flaps in the second position.

12. The device of claim 11, wherein the active wheel cap flap is pivotally attached to the pivot contact of the dynamic mechanism hub, and wherein an opening in the gap distance between the plurality of vehicle wheel spoke cover flaps is exposed in the first position, and wherein the opening in the gap distance between the plurality of vehicle wheel spoke cover flaps is covered by the active wheel cap flap in the second position.

13. The device of claim 12, wherein the linkage further comprises:
    a first link having a first end and a second end, the first end of the first link extending radially outward from a center of the mount body to the second end of the first link, wherein the first link is rotationally interconnected to the mount body at the first end of the first link; and
    a second link having a first end and a second end, wherein the first end of the second link is rotationally connected to the second end of the first link, and wherein the second end of the second link is rotationally connected to the actuation mass;
    wherein the actuation mass translates from the first position to the second position as the mount body and the vehicle wheel rotate in unison at a predetermined angular velocity about a center axis of the vehicle wheel.

14. The device of claim 13, wherein centripetal force generated by the vehicle wheel rotating at or above the predetermined angular velocity about the center axis moves the actuation mass in a direction outwardly from the center axis of the vehicle wheel to the second position.

15. The device of claim 14, wherein a decrease in centripetal force generated by the vehicle wheel rotating below the predetermined angular velocity about the center axis moves the actuation mass in a direction toward the center axis of the vehicle wheel to the first position.

16. The device of claim 15, wherein a compression spring is arranged adjacent to the guide track and configured to bias the actuation mass in the first position.

17. The device of claim 15, wherein a torsion spring is disposed between the mount body and the dynamic mechanism hub, and wherein the torsion spring biases the actuation mass in the first position.

18. The device of claim 15, wherein the linkage is disposed behind at least two static wheel cap flaps by an offset distance, and wherein a link joint connects the linkage to the active wheel cap flap.

19. A vehicle wheel and aerodynamic wheel cap assembly, comprising:
    a wheel hub disposed at the center of the vehicle wheel and including a center axis running therethrough;

a wheel rim concentric to and completely surrounding the wheel hub;

a plurality of spokes radially extending from the wheel hub and connecting the wheel hub to the wheel rim;

a wheel cap device, comprising:

at least two static wheel cap flaps aligned to cover a portion of each of the plurality of spokes;

a static mechanism hub fixedly attached to the vehicle wheel, wherein the at least two static wheel cap flaps are fixedly coupled to the static mechanism hub and radially separated from one another by a gap distance;

an active wheel cap flap that fits in the gap distance and moves relative to the at least two static wheel cap flaps;

a dynamic mechanism hub offset from and rotationally interconnected with the static mechanism hub, wherein the active wheel cap flap is connected to the dynamic mechanism hub at a pivot point; and a flap actuation mechanism comprising a guide track, an actuation mass that translates at least partially in the guide track from a first position adjacent to a center of the static mechanism hub to a second position disposed further from the center of the static mechanism hub than the first position, and a linkage connecting the actuation mass to a portion of the active wheel cap flap;

wherein the active wheel cap flap is rotated about the pivot point and disposed at least partially behind one of the at least two static wheel cap flaps in the first position, and wherein the active wheel cap flap is disposed substantially coplanar with the at least two static wheel cap flaps in the second position.

20. The assembly of claim 19, wherein an opening in the gap distance between the at least two static wheel cap flaps is exposed in the first position providing an air vent path between and through the plurality of spokes, and wherein the opening in the gap distance between the at least two static wheel cap flaps is covered by the active wheel cap flap in the second position.

* * * * *